(12) United States Patent
Burgoon et al.

(10) Patent No.: US 7,997,391 B2
(45) Date of Patent: Aug. 16, 2011

(54) ANTI-LOCK BRAKE DEVICE FOR USE WITH A BRAKE ROTOR DISC

(75) Inventors: Donald L. Burgoon, Gastonia, NC (US); Joseph Bradley Dalton, York, SC (US); Scott Andrew Paul, Lake Wylie, SC (US); Craig A. Van Harken, Charlotte, NC (US)

(73) Assignee: Performance Friction Corporation, Clover, SC (US)

( * ) Notice: Subject to any disclaimer, the term of this patent is extended or adjusted under 35 U.S.C. 154(b) by 231 days.

(21) Appl. No.: 11/553,068

(22) Filed: Oct. 26, 2006

(65) Prior Publication Data
US 2008/0099288 A1      May 1, 2008

(51) Int. Cl.
*F16D 65/10* (2006.01)
(52) U.S. Cl. ............... 188/218 XL; 188/18 A; 301/6.8; 301/105.1; 324/173
(58) Field of Classification Search ............ 188/218 XL, 188/18 A, 1.11 E, 1.11 R, 17, 218 R; 324/166, 324/173, 174, 207.22, 207.25; 301/6.8, 105.1; 384/448
See application file for complete search history.

(56) References Cited

U.S. PATENT DOCUMENTS

| | | | |
|---|---|---|---|
| 3,626,226 A | | 12/1971 | Pauwels et al. |
| 3,626,228 A * | | 12/1971 | Jordan et al. ............... 310/168 |
| 3,949,841 A * | | 4/1976 | Jovick et al. ............. 188/181 R |
| RE30,522 E | | 2/1981 | Gee et al. |
| 4,940,937 A * | | 7/1990 | Hattori ....................... 324/207.22 |
| 5,053,656 A * | | 10/1991 | Hodge ............................. 310/42 |
| 5,166,611 A * | | 11/1992 | Kujawa et al. ................ 324/166 |
| 5,476,272 A * | | 12/1995 | Hixson, II ...................... 277/317 |
| 5,695,289 A * | | 12/1997 | Ouchi et al. ................... 384/448 |
| 5,714,016 A * | | 2/1998 | Ueda et al. ..................... 148/246 |
| 6,498,475 B2 * | | 12/2002 | Foster et al. .................... 324/173 |
| 6,619,440 B2 * | | 9/2003 | Antony et al. ................... 188/17 |
| 6,945,367 B1 | | 9/2005 | Yuhas |
| 7,219,778 B2 * | | 5/2007 | Pete et al. ............... 188/218 XL |
| 2006/0091723 A1 | | 5/2006 | Pete et al. |
| 2006/0124411 A1 | | 6/2006 | Redgrave |
| 2006/0272906 A1 * | | 12/2006 | Gonska ................... 188/218 XL |

FOREIGN PATENT DOCUMENTS

| | | |
|---|---|---|
| DE | 10237504 | 3/2004 |
| WO | 2006008044 | 1/2006 |

* cited by examiner

*Primary Examiner* — Robert Siconolfi
*Assistant Examiner* — Mariano Sy
(74) *Attorney, Agent, or Firm* — Roberts Mlotkowski Safran & Cole P.C.

(57) ABSTRACT

A disc brake assembly includes a rotor with an ABS tone ring insert assembly that functions as a rotation indicator in an anti-lock braking system. The insert is positioned in the hat of a rotor disc in a spaced relationship and is mounted to the mounting flange of the rotor disc. Forming the ring insert separately from the rotor disc also allows different coating materials to be used on the tone ring that may be more heat resistant. The ring insert assembly can be made of powder metal or made as a cast iron cylinder with a toothed cap made of powder metal having a corrosion resistant coating. Cost savings can be realized along with high performance when only a portion of the assembly if made of powder metal and coated.

44 Claims, 10 Drawing Sheets

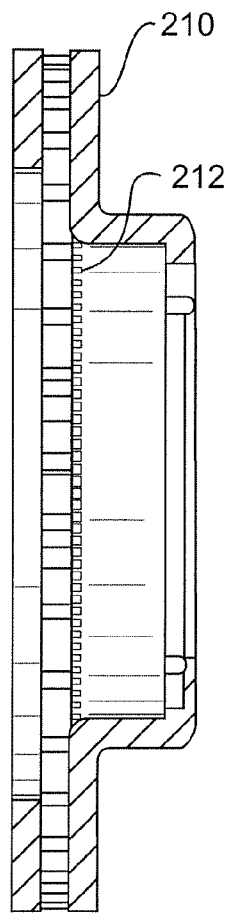
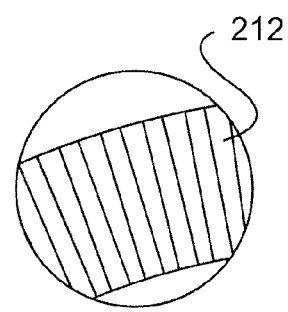
FIG. 11
PRIOR ART
FIG. 10
PRIOR ART

ANTI-LOCK BRAKE DEVICE FOR USE WITH
A BRAKE ROTOR DISC

BACKGROUND OF THE INVENTION

1. Field of the Invention

The invention relates to brake assemblies, especially vehicular brakes including brake rotors attached to wheel hubs. This invention particularly relates to brake rotor disc assemblies equipped with anti-lock brake devices.

2. Description of Related Art

Typically, vehicles are equipped with a brake system to provide controlled slowing or stopping of the wheels to halt movement of the vehicle. A common type of brake system is a disc brake assembly associated with the wheels that is actuated by hydraulic or pneumatic pressure generated by an operator of the vehicle depressing a foot pedal. As is known, a disc brake assembly generally includes a rotor secured to the wheel of the vehicle for rotation therewith. The rotor has a pair of opposed friction plates that are selectively engaged by brake shoes supported on opposite sides of the rotor for sliding movement relative thereto.

In operation, the brake pads, which are operatively connected to hydraulically actuated pistons, move between a non-braking position in which they are spaced apart from the opposed friction plates of the rotor and a braking position in which they are moved into frictional engagement with the opposed friction plates of the rotor. In response to actuation by an operator, typically by depressing a brake pedal, the piston urges the brake pads from the non-braking position to the braking position. By this, the brake pads frictionally engage the friction plates of the rotor and slow or stop the rotation of the associated wheel of the vehicle.

To improve braking control and vehicle safety, anti-lock brake systems have been developed. In accordance with these systems, rotation of the wheel is sensed, and the braking response is automatically controlled to avoid skidding situations in which the vehicle wheels lose traction and slide over the pavement rather than engaging the surface at a slower rotational speed.

In a typical anti-lock brake assembly 200 seen in FIGS. 8-11, the rotor 210 is provided with a ring of teeth 212, which are cast with the rotor, commonly referred to as an ABS (Anti-lock Braking System) tone ring. As the rotor 210 rotates, the rotating teeth 212 are read by an anti-lock brake sensor (not shown) that generates a signal for the anti-lock brake control system representative of the rotation of the wheel associated with the rotor 210. The sensor reads the peaks of the teeth and the valleys between adjacent teeth, best seen in FIGS. 10 and 11, and uses an algorithm to determine whether the associated wheel is slipping. If it is determined that the wheel is slipping, braking pressure is released. Obviously, the arrangement and geometry of the teeth influence the signal generated by the sensor. To ensure proper operation of the anti-lock brake system, the teeth must be regularly spaced, sized, and maintained to preserve the profile of the teeth. Many sensors use magnetic pulse generation, which is created as the teeth pass by the sensor. The strength and accuracy of the signal is determined by the magnetic properties of the tone ring and the ring's geometric accuracy. Inadequate magnetic signal strength or incorrect geometric shape may cause signal failure, which can be further influenced by rotating velocity.

Problems have arisen with anti-lock brake systems in terms of poor performance due to irregularities and corrosion of the teeth. In known rotor assemblies in which the teeth are cast with the rotor, the teeth are also subjected to machining and coating treatments that are applied to the rotor. The disc is typically coated with an anticorrosive material, such as Geomet or Magni type coatings, that has a friction property and a corrosion resistance property. The coating is intended to lengthen the shelf life of the rotor and impede corrosion. However, since the coating is present when the rotor is put in use and then wears away from the braking surface, the coating must have adequate friction properties so that the rotor functions properly during braking at the outset before the coating is worn off. These dual property constraints limit the possible types of coatings suitable for this application.

Another consideration regarding the coating relates to the teeth. As noted above, the teeth are cast with the rotor, and the coating is applied to the entire piece. However, the teeth involve different design considerations. As the teeth do not function as a friction surface, the friction property of the coating is irrelevant. Further, it is desirable to maintain the anti-corrosive coating on the teeth for the functional life of the assembly. However, coatings suitable for rotor application degrade at high temperatures. This does not pose a problem with respect to the braking surface, but the teeth are exposed to high temperatures during the braking process. Since they are formed integrally with the rotor, which is normally cast iron, they heat to high temperatures, such as 800-900° F., as the rotor heats up due to the heat generated during braking. When the coating breaks down, the teeth can corrode. Corrosion alters the geometry of the teeth and causes inaccurate readings from the anti-lock braking sensor. This significantly shortens the useful life of the brake rotor assembly. When the sensor generates inaccurate readings, the assembly requires repair or replacement.

A problem also exists due to the state of the art casting methods and tolerances, which exist in casting of the teeth. Cast teeth will not be sufficiently accurate for most applications, and the inaccuracy in geometry will cause signal failure at higher velocities. To further machine the teeth for accuracy adds significant additional cost.

Another problem with cast iron tone rings relates to the magnetic properties of cast iron and how the properties change with temperature. Since cast iron has a high carbon content, its magnetism is reduced when heated to high temperatures experienced during braking.

There is a need, therefore, to provide a brake rotor assembly for use with anti-lock brake systems that provides an accurate and durable sensor system. There is also a need for a sensor system that can be retrofit in existing assemblies that no longer provide accurate readings.

SUMMARY OF THE INVENTION

An aspect of the invention provides a brake assembly having a rotor with an ABS tone ring for use with an anti-lock brake assembly that provides accurate and reliable readings.

Another aspect of the invention provides a brake assembly having a rotor with an ABS tone ring for use with an anti-lock brake assembly that has a relatively long service life.

An additional aspect of the invention provides a brake assembly having a rotor with an ABS tone ring for use with an anti-lock brake assembly that accommodates more versatile and durable coatings suitable for high temperature environments at a reasonable cost.

A further aspect of embodiments of the invention provides a tone ring assembly that can be retrofit in existing brake rotor systems.

The invention is directed to a brake rotor disc assembly comprising a rotor disc having a braking surface and a hat portion for mounting to a wheel hub, wherein the hat portion includes a cylindrical body and a radial mounting flange, and a tone ring insert for use with an anti-lock braking system. The tone ring insert includes a cylindrical portion and a sensor flange having a radial surface with a plurality of spaced sensing formations disposed thereon. The cylindrical portion is mounted to the radial mounting flange such that the tone ring insert is positioned within and spaced from the cylindrical body.

The invention is also directed to a brake rotor disc assembly comprising a rotor disc, which has a braking surface and a hat portion for mounting to a wheel hub, and a tone ring insert assembly. The hat portion includes a cylindrical body and a mounting flange. The tone ring insert assembly is designed for use with an anti-lock braking system and includes a cylindrical spacer positioned in the hat portion and mounted to the mounting flange and a cap coupled to the cylindrical spacer and having a toothed flange.

The invention includes the brake rotor disc assembly in combination with an anti-lock braking system including a sensor that generates signals based on rotation of the tone ring insert assembly and in combination with a vehicle.

The invention further relates to a tone ring assembly for use in an anti-lock braking system comprising a cylindrical spacer having a first end and a second end, wherein the first end has a plurality of axial openings formed therein, and a cap having an axial engaging portion and a radial flange extending from the axial engaging portion, wherein the radial flange has a ring of spaced teeth formed in a surface thereof. The axial engaging portion is fixed to the second end of the cylindrical spacer.

In the tone ring assembly, the cylindrical spacer can be made of cast iron, while the cap is made of powder metal in a high precision process and has a corrosion resistant coating thereon.

These and other aspects of the invention will become apparent in view of the detailed description and drawings herein.

BRIEF DESCRIPTION OF THE DRAWINGS

The invention is described in conjunction with the following drawings in which like reference numerals designate like elements and wherein:

FIG. 10 is a sectional side view taken along line B-B of FIG. 9; and

FIG. 11 is an enlarged view of section C of FIG. 9.

DETAILED DESCRIPTION OF PREFERRED EMBODIMENTS

The disc brake rotor assembly described herein is preferred for use on vehicles, including automobiles, racing vehicles, trucks, heavy duty trucks, motorcycles and the like. The vehicles particularly suitable for use with this invention can include those vehicles having a gross vehicle weight of about 10,000 pounds and above, especially delivery trucks and buses. However, the inventive concepts discussed herein can be used in any type of application that uses rotary brakes, including automotive, other types of motorized vehicles, or railcars. The invention is especially applicable for retrofitting in existing vehicles.

Figure 1:
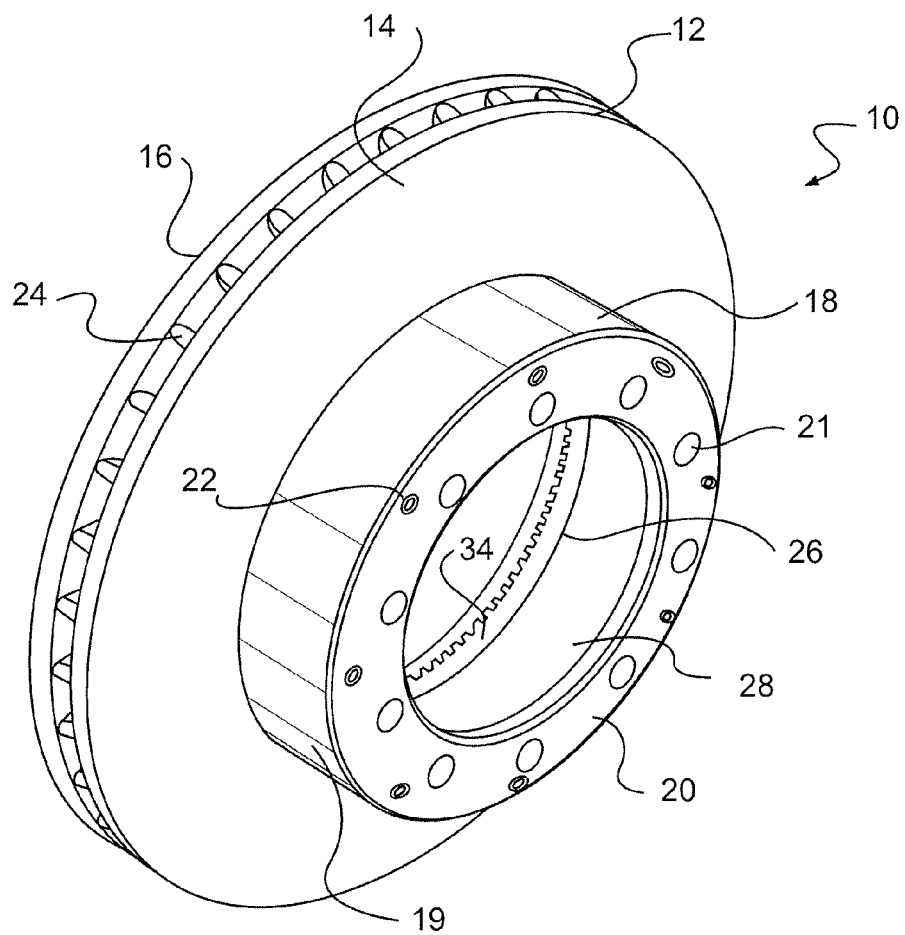
FIG. 1 is a top perspective view of the rotor disc assembly in accordance with this invention.
Figure 2:
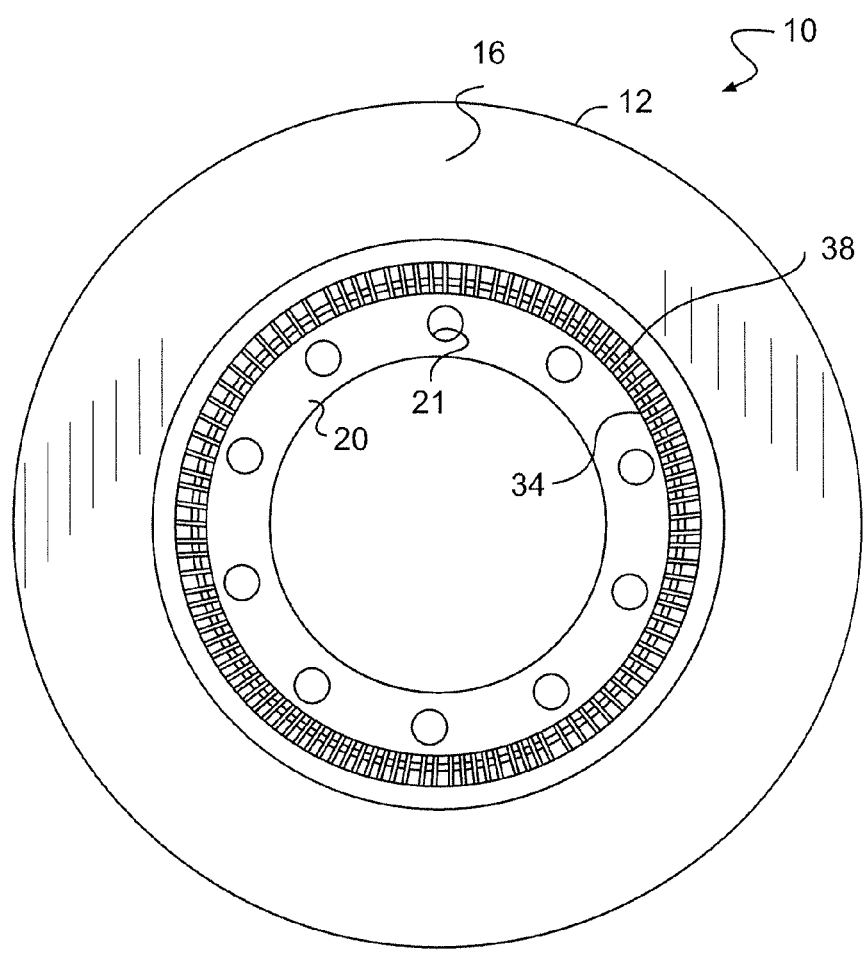
FIG. 2 is a bottom view of the rotor disc assembly of FIG. 1.
Figure 3:
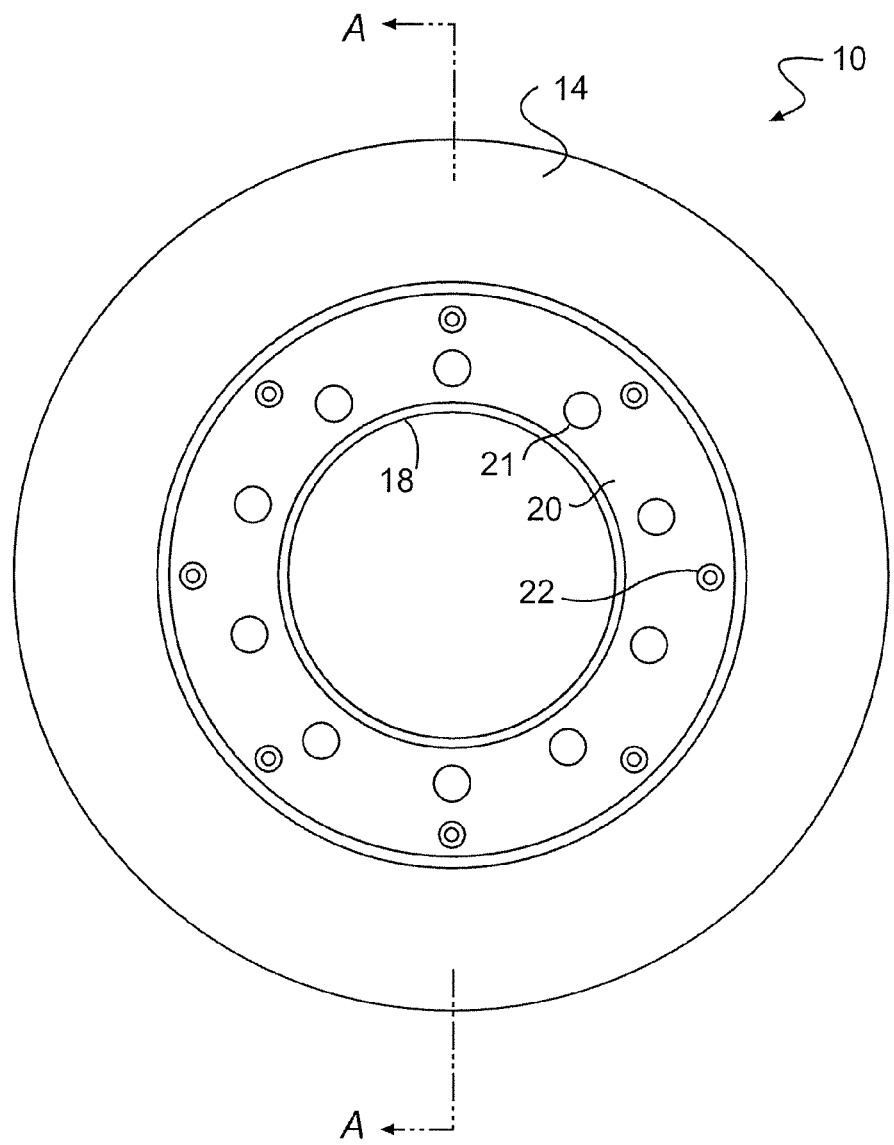
FIG. 3 is a top view of the rotor disc assembly of FIG. 1.
Figure 4:
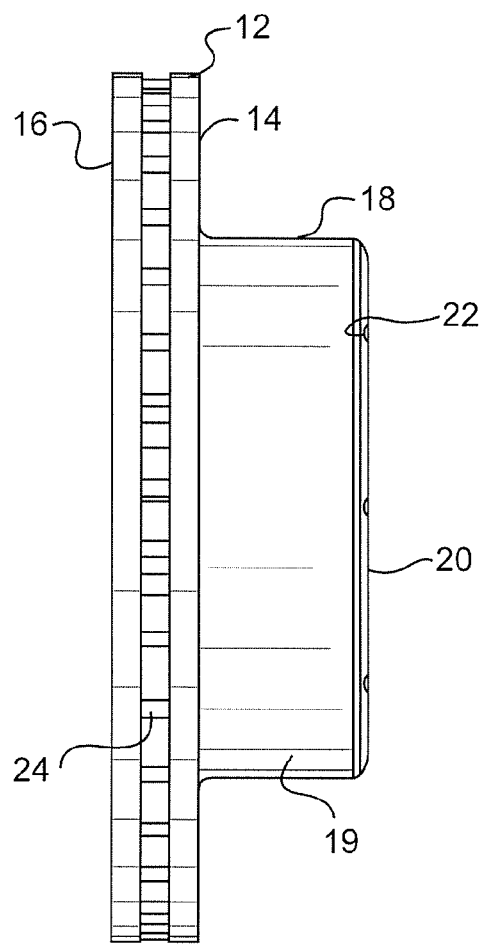
FIG. 4 is a side view of rotor disc assembly of FIG. 1.

FIG. 1 shows a brake rotor disc assembly 10 in accordance with the invention. The brake rotor disc assembly 10 includes a rotor disc 12 having a pair of opposed braking plates 14, 16 with friction material on the surface of each plate and a hat portion 18 for connection to a wheel hub (not shown) as is known. The hat portion 18 is defined by a cylindrical body 19 and a mounting flange 20. The mounting flange 20 has a series of openings 21 to receive fasteners for connection to the wheel hub. Another series of openings 22, best seen in FIG. 3, are provided on the outer edge of the mounting flange 20. Preferably, the openings 22 are formed as counterbores. The rotor disc 12 shown in FIG. 1 is a ventilated disc with vanes 24 formed between the braking plates 14, 16; however, this invention can be employed in single plate discs as well, as would be readily recognized by those of ordinary skill in the art. The rotor disc 12 is preferably made of cast iron. However, any conventionally known material may be used, including a composite.

In accordance with this invention, an independent toothed ring insert assembly or ABS tone ring insert is coupled to the rotor disc 12. The toothed ring insert can be formed as a single piece in which the ring has teeth formed on a radial flange. With a single piece, any suitable material could be used. For example, the insert could be made entirely of powder metal with a corrosion resistant coating formed thereon. Alternatively, the insert could be made by molding a steel stamping into a high temperature resistant plastic or rubber. To reduce costs and offer additional material alternatives, the insert could be formed in two pieces. This configuration is illustrated in the drawings, but it will be recognized to those of ordinary skill in the art that the design of a one-piece insert would be similar except that the two pieces would be a unitary piece.

Referring to FIGS. 1-7, a toothed ring insert 26 is shown coupled to the rotor disc 12. The insert 26 is formed in two pieces. The first piece is a cylindrical portion or spacer 28 having an annular side wall with a series of axial counterbore threaded openings 30 formed in one end. The other end has an interior annular groove 32 formed therein. Preferably the cylindrical spacer 28 is formed of cast iron, which is durable and relatively low cost. The second piece is a cap 34 that is formed as a toothed ring. The cap 34 is formed as a radial flange 36 including a ring of spaced teeth 38 and an axial engaging portion 40. The cap 34 is made with highly accurate geometry to form well defined teeth that interact with the ABS sensor. The teeth 38 can be any type of sensing formations, such as serrations, alternating peaks and valleys, or openings. Preferably, the cap 34 is made by stamping, molding with powder metal or by machining. For cost purposes, a powder metal part or stamped part is preferred.

Figure 5:
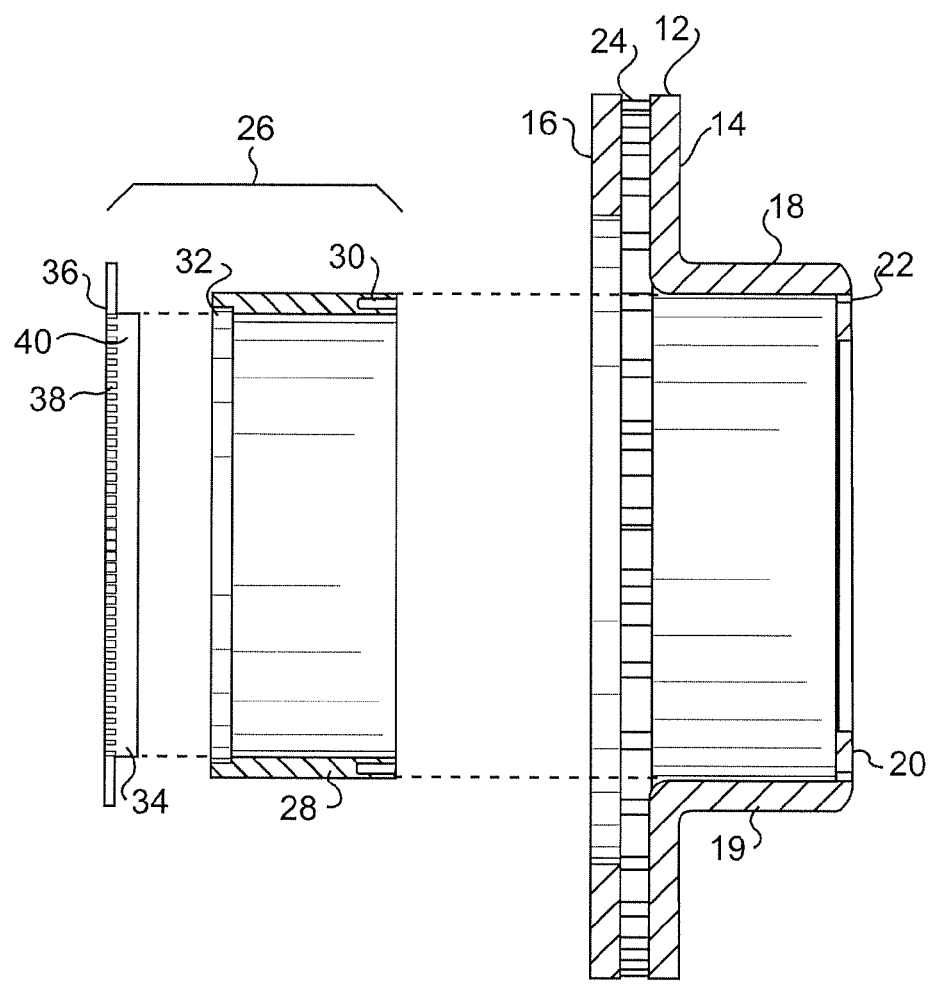
FIG. 5 is an exploded side view in partial section taken along line A-A of FIG. 3.
Figure 6:
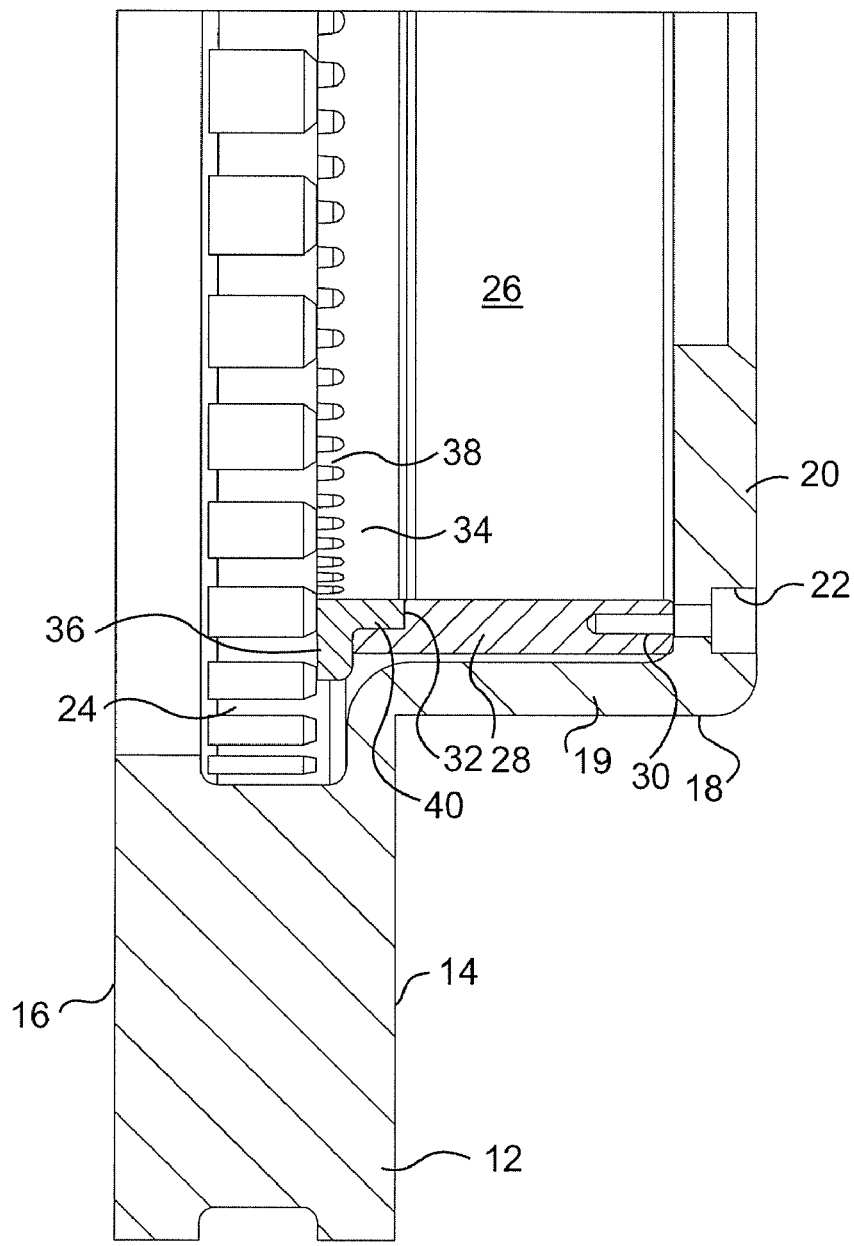
FIG. 6 is an enlarged partial side view of in section taken along line A-A of FIG. 3.

This assembly takes advantage of the lower cost of the cast iron cylindrical spacer 28 and high geometric accuracy and heat resistant magnetic properties of the powder metal cap 34 by connecting the two pieces together to act as the tone ring insert assembly 26. The coupling can be achieved by a press fit, bolt, screw, pin, snap ring, thread or tongue and groove. One method of connection would be to use a protruding lip on the cap that is press fit within the spacer 28 to engage the annular groove 32. Alternatively, the annular groove in the spacer 28 could be formed as an exterior annular groove with the same connecting effect. As best seen in FIGS. 5 and 6, a preferred method of connection is to knurl or serrate the axial engaging portion 40 and press fit the portion 40 into the groove 32 of the spacer 28. Of course, any type of known connecting method can be used to achieve an integral component formed of two separate pieces. For example, connection can be made by a bolt, a pin, a snap ring, threads, or tongue and groove.

Another advantage of using two pieces for the tone ring insert 26 is that only the cap 34 needs corrosion resistant coating to protect the geometry of the teeth 38 and prevent corrosion build up to ensure accurate readings from the ring. This reduces costs as the cast iron spacer 28 does not need a coating. A preferred coating is an electroless plating process, as is known in the art. For example, electroless nickel can be used for corrosion resistance. Of course, any suitable coating can be used, including any electro-plating, electroless-plating or metallurgical plating. In the case of a one piece insert, the entire piece could be coated if desired.

Figure 7:
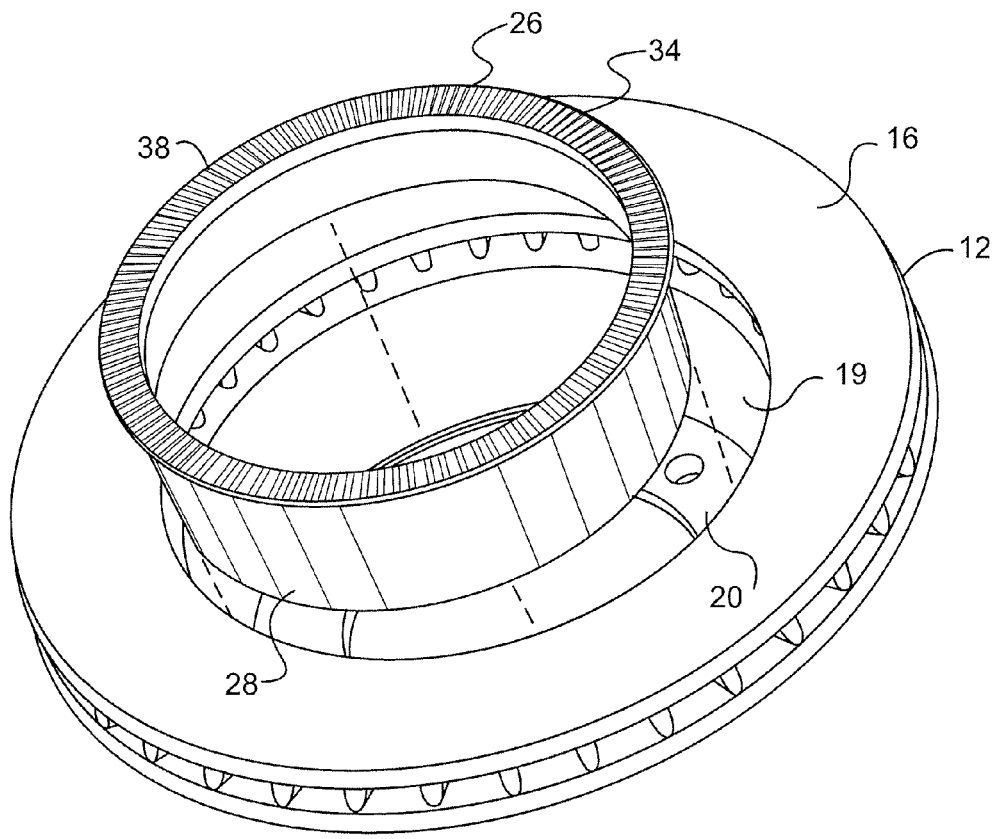
FIG. 7 is an exploded bottom perspective view of the assembly of FIG. 1.
Figure 8:
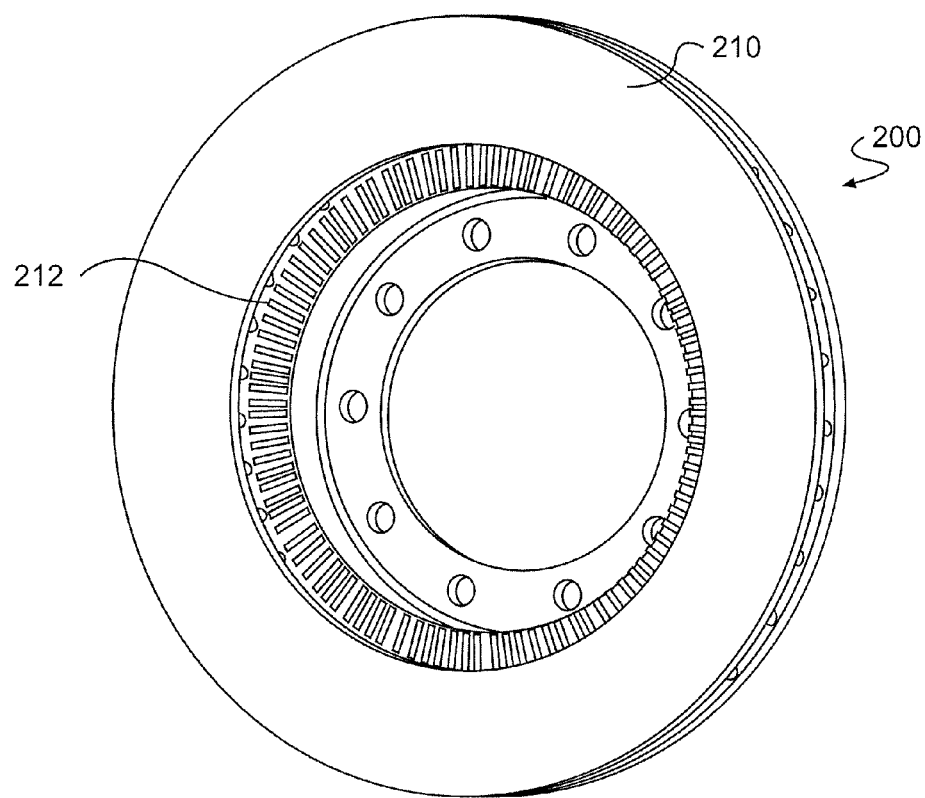
FIG. 8 is a bottom perspective view of a prior art rotor disc assembly.
Figure 9:
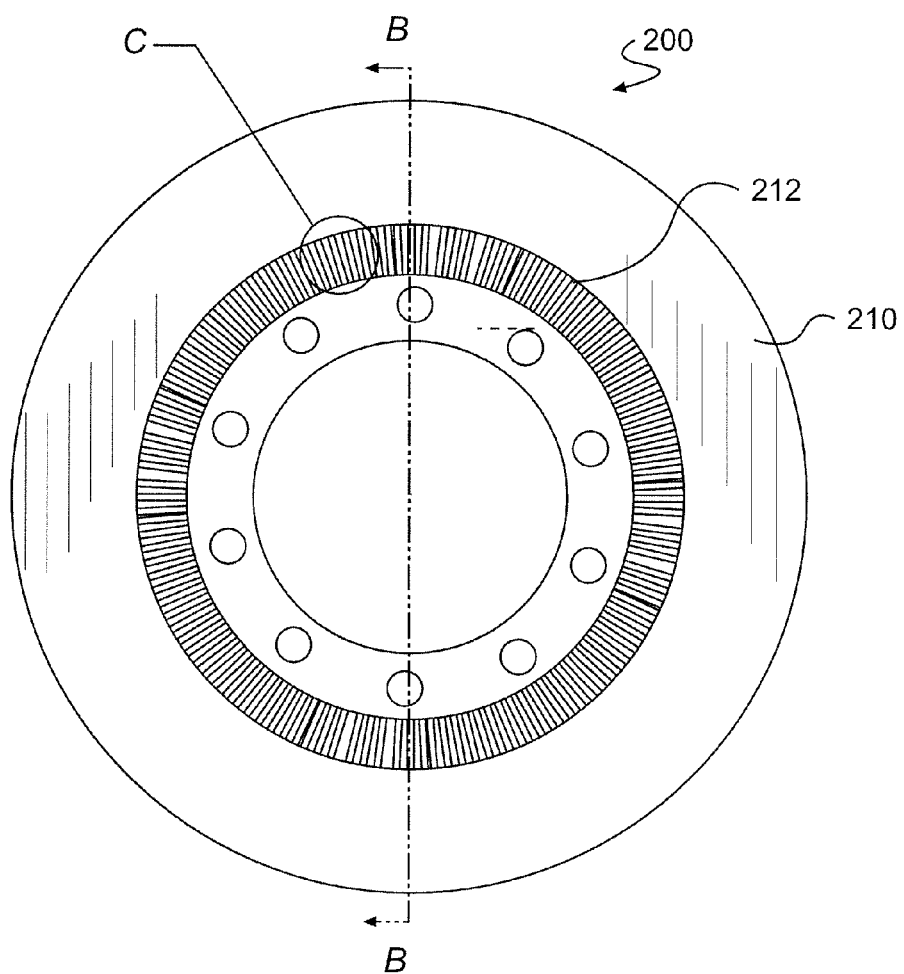
FIG. 9 is a bottom view of the rotor disc assembly of FIG. 8.

The ring insert 26 is assembled with the rotor disc 12 by inserting the ring insert 26 into the hat portion 18, as seen in FIGS. 6-7. A plurality of fasteners is used to connect the ring insert 26 to the mounting flange 20 by extending through openings 22 into threaded openings 30. By this, the ring insert 26 is fastened to the rotor disc 12 at the wheel mounting face, which is the farthest point from the heat generating friction faces 14, 16 and is least susceptible to thermal deformation. As seen in FIG. 6, the ring insert 26 is independent of and spaced from the cylindrical body 19, which provides some thermal insulation to the ring insert 26, especially as compared to conventional integral toothed rotors in anti-lock brake assemblies. Also, since the ring insert 26 is fastened to the mounting flange 20 and sits within the hat portion 18, radially inwardly from the braking plates 14, 16, any twisting or bending experienced by braking plates 14, 16 due to thermal stresses induced during braking would not be translated to the ring insert 26. Additionally, by forming the ring insert 26 separately from the rotor disc 12, the choice of coating materials for the cap 34 is expanded as the coating material for the teeth does not need the friction quality required by the braking plates 14, 16.

The assembly 10 can be originally manufactured or retrofit on vehicles into existing brake rotor systems to replace ABS systems that no longer provide accurate readings due to incorrect geometries and/or corrosion. First, the cap 34 is fixed to the spacer 28 to assemble the tone ring insert assembly 26. The assembly 26 is then secured to the mounting flange 20 of a brake rotor disc 12 with the fasteners as described above. The entire assembly 10 is then installed in place of a conventional brake rotor. Of course, if a one-piece insert is used, the entire insert is simply installed to the mounting flange of the brake rotor disc. Since the toothed cap 34 is formed with a high precision process such as stamping, molded from powder metal, or machined, the geometry is highly accurate. The corrosion resistant coating on the toothed cap 34 ensures that corrosion will not occur and compromise the geometry of the teeth or interfere with sensor readings. Accordingly, a highly reliable brake rotor disc assembly 10 can be retrofit into an existing vehicle at a relatively low cost.

It can be appreciated that the ring insert 26 functions in the same manner as known toothed rings associated with brake rotor discs with anti-locking braking systems. The rotation of the teeth 38 is sensed by an anti-locking sensor to assess whether the wheel is slipping. The braking action is adjusting accordingly. Using this invention, however, will provide a more accurate and reliable reading since corrosion of the teeth is minimized and the teeth can be formed with high precision. This invention will also provide a longer service life for brake assemblies, especially in large vehicles, such as delivery trucks and buses and allow degraded tone rings to be easily replaced.

The invention is not limited to those embodiments described herein and may encompass various changes and modifications. It will be understood that the various modifications shown herein can be used in any combination. It is also possible to eliminate various components of the assembly and still have an effective connection. Further, different materials may be used to obtain similar results.

What is claimed is:

1. A brake rotor disc assembly comprising:
   a rotor disc having a braking surface and a hat portion for mounting to a wheel hub, wherein the hat portion includes a cylindrical body and a radial mounting flange; and
   a tone ring insert for use with an anti-lock braking system including a cylindrical portion having an outer cylindrical surface and a sensor flange having a radial surface with a plurality of spaced sensing formations disposed thereon,
   wherein the cylindrical portion is mounted to the radial mounting flange such that the entire outer cylindrical surface of the cylindrical portion is positioned within and spaced from the cylindrical body, so as to thermally insulate the tone ring insert
   wherein the cylindrical portion of the tone ring insert has threaded axial bores therein for receiving a fastener for coupling to the rotor disc.

2. The assembly of claim 1, wherein the tone ring insert is formed as a unitary ring.

3. The assembly of claim 1, wherein the tone ring insert is formed in two pieces, with the cylindrical portion connected to the sensor flange.

4. The assembly of claim 3, wherein the cylindrical portion and the sensor flange are formed of different materials.

5. The assembly of claim 4, wherein the cylindrical portion is formed of cast iron and the sensor flange is formed of powder metal.

6. The assembly of claim 3, wherein the sensor flange is press fit into the cylindrical portion.

7. The assembly of claim 3, wherein the cylindrical portion has an annular groove on one end and the sensor flange has an axial engaging portion that is received in the annular groove.

8. The assembly of claim 1, further comprising a plurality of bolts extending through the mounting flange and threadably engaged with the tone ring insert.

9. The assembly of claim 1, wherein the tone ring insert has a non-corrosive coating thereon.

10. The assembly of claim 9, wherein the tone ring insert is plated with electroless plating.

11. The assembly of claim 1, in combination with an anti-lock braking system including a sensor that generates signals based on rotation of the tone ring insert.

12. The assembly of claim 1, in combination with a vehicle.

13. The assembly of claim 1, in combination with a vehicle having a gross vehicle weight of at least 5,000 pounds.

14. A brake rotor disc assembly comprising:
    a rotor disc having a braking surface and a hat portion for mounting to a wheel hub, wherein the hat portion includes a cylindrical body and a mounting flange; and
    a tone ring insert assembly spaced from said cylindrical body so as to thermally insulate said tone ring insert assembly for use with an anti-lock braking system including a cylindrical spacer having an outer cylindrical surface positioned concentrically in the hat portion and a cap coupled to the cylindrical spacer having a toothed flange, wherein the entire outer cylindrical surface is spaced from said cylindrical body
wherein the cylindrical spacer of the tone ring insert assembly has threaded axial bores therein.

15. The assembly of claim 14, wherein the cylindrical spacer and the cap of the tone ring insert assembly are formed of different materials.

16. The assembly of claim 14, wherein the cylindrical spacer of the tone ring insert assembly is formed of cast iron.

17. The assembly of claim 14, wherein the cap of the tone ring insert assembly is formed of powder metal.

18. The assembly of claim 14, wherein the cap of the tone ring insert assembly is formed by stamping.

19. The assembly of claim 14, wherein the cap of the tone ring insert assembly is formed by machining.

20. The assembly of claim 14, wherein the cap is press fit into the cylindrical spacer.

21. The assembly of claim 14, wherein the tone ring insert assembly is connected to the hat portion at a position farthest from the braking surface of the rotor disc.

22. The assembly of claim 14, wherein the cylindrical spacer of the tone ring insert assembly is fastened to the mounting flange of the rotor disc.

23. The assembly of claim 14, wherein the cylindrical spacer has an annular groove on an end opposed to the axial bores and the cap has an axial engaging portion that is received in the annular groove.

24. The assembly of claim 14, further comprising a plurality of bolts extending through the mounting flange and threadably engaged with the cylindrical spacer of the tone ring insert assembly.

25. The assembly of claim 14, wherein the cap has a non-corrosive coating thereon.

26. The assembly of claim 25, wherein the cap is plated with electroless plating.

27. The assembly of claim 14, wherein the toothed flange is substantially parallel to the braking surface of the rotor disc.

28. The assembly of claim 14, in combination with an anti-lock braking system including a sensor that generates signals based on rotation of the tone ring insert assembly.

29. The assembly of claim 14, in combination with a vehicle.

30. The assembly of claim 14, in combination with a vehicle having a gross vehicle weight of at least 5,000 pounds.

31. A tone ring assembly, comprising:
a cylindrical spacer having a single outer diameter defining an outer cylindrical surface, a first end and a second end, said outer diameter sized to enable said cylindrical spacer to be positioned concentrically within a hat portion of a rotor disc, so that said outer cylindrical surface is spaced apart from the hat portion, so as to thermally insulate said tone ring insert, wherein the first end has a plurality of axial openings formed therein; and
a cap having an axial engaging portion and a radial flange extending outward from the axial engaging portion, wherein the radial flange has a ring of spaced teeth formed in a surface thereof,
wherein the axial engaging portion is fixed to the second end of the cylindrical spacer.

32. The assembly of claim 31, wherein the axial engaging portion is press fit within the second end of the cylindrical spacer.

33. The assembly of claim 31, wherein an annular groove is formed in the second end of the cylindrical spacer and the axial engaging portion is knurled.

34. The assembly of claim 31, wherein the cylindrical spacer is made of cast iron.

35. The assembly of claim 31, wherein the cap is formed of powder metal.

36. The assembly of claim 31, wherein the cap is formed by machining, stamping or molding.

37. The assembly of claim 31, wherein the cap has a corrosion resistant coating formed thereon.

38. The assembly of claim 31, wherein the cap is electroless plated.

39. The assembly of claim 31, in combination with a brake rotor.

40. The assembly of claim 39, further comprising fasteners that extend into the axial openings in the cylindrical spacer to connect the assembly to a mounting flange of a brake rotor.

41. The assembly of claim 39, wherein the brake rotor includes a braking disc mounted on one end of a cylindrical body and a mounting flange mounted on the other end of the cylindrical body, wherein the fasteners extend through the mounting flange to connect to the assembly.

42. The assembly of claim 31, in combination with a brake rotor, wherein the assembly is retrofit in an anti-lock braking system.

43. The assembly of claim 31, in combination with a vehicle.

44. The assembly of claim 31, in combination with a vehicle having a gross vehicle weight of at least 5,000 pounds.

* * * * *